United States Patent
Obermeyer et al.

(10) Patent No.: US 10,399,477 B2
(45) Date of Patent: Sep. 3, 2019

(54) METHOD AND APPARATUS FOR LOADING AND/OR UNLOADING CASKETS

(71) Applicant: Batesville Services, Inc., Batesville, IN (US)

(72) Inventors: Randall G. Obermeyer, Batesville, IN (US); Steven Peter Pappas, Cincinnati, OH (US); Christopher Carl Struewing, Batesville, IN (US); Melissa Kay Teer, Milan, IN (US); Todd Michael Laughery, Winter Haven, FL (US); Richard Corby, Halifax, MA (US); William D. Tallant, Plainfield, IN (US); Henry L. Trenkamp, Batesville, IN (US); Timothy James Krause, Orland Hills, IL (US)

(73) Assignee: Batesville Services, Inc., Batesville, IN (US)

( * ) Notice: Subject to any disclaimer, the term of this patent is extended or adjusted under 35 U.S.C. 154(b) by 0 days.

(21) Appl. No.: 15/192,111

(22) Filed: Jun. 24, 2016

(65) Prior Publication Data

US 2016/0375812 A1 Dec. 29, 2016

Related U.S. Application Data

(60) Provisional application No. 62/185,232, filed on Jun. 26, 2015.

(51) Int. Cl.
*B60P 1/44* (2006.01)
*B60P 1/43* (2006.01)
*A61G 19/00* (2006.01)

(52) U.S. Cl.
CPC .............. *B60P 1/4407* (2013.01); *B60P 1/43* (2013.01); *B60P 1/4457* (2013.01); *A61G 19/00* (2013.01)

(58) Field of Classification Search
CPC . A61G 19/00; A61G 21/00; B60P 1/43; B60P 1/4407; B60P 1/4457; B60P 1/6454
(Continued)

(56) References Cited

U.S. PATENT DOCUMENTS 308,200 A * 11/1884 Rowe ........................ B60P 1/43
414/537
1,289,786 A 12/1918 Ittner
(Continued)

FOREIGN PATENT DOCUMENTS

DE 4004960 A1 * 8/1991 ............ B60P 1/4457
WO WO-0061402 A1 * 10/2000 ............ B60P 1/4407

*Primary Examiner* — James Keenan
(74) *Attorney, Agent, or Firm* — Wood Herron & Evans LLP

(57) ABSTRACT

A casket loading and/or unloading apparatus comprises a frame having an end adapted to be pivoted adjacent a rear edge of a bed of a transport vehicle for pivoting about a pivot axis generally transverse to a longitudinal axis of the transport vehicle, and a motion generating device operable between the frame and the transport vehicle for pivoting the frame from a first generally vertical position to a second at least generally horizontal position. A vertically oriented casket in the transport vehicle can be secured to the frame, and the frame with the casket secured thereto can be pivoted from the first generally vertical position to the second at least generally horizontal position to facilitate unloading the casket from the transport vehicle.

27 Claims, 6 Drawing Sheets

(58) Field of Classification Search
USPC ............ 410/6; 414/346, 350, 554, 537, 546
See application file for complete search history.

(56) References Cited

U.S. PATENT DOCUMENTS

| | | | | |
|---|---|---|---|---|
| 1,445,913 | A | * | 2/1923 | Roos ..................... B62D 43/02 |
| | | | | 414/546 |
| 1,910,398 | A | * | 5/1933 | Ludington ............ B60P 1/6418 |
| | | | | 414/350 |
| 1,944,063 | A | | 1/1934 | Brauner |
| 2,276,127 | A | | 3/1942 | Wahl |
| 2,593,717 | A | * | 4/1952 | Barrot, Jr. .............. A61G 19/00 |
| | | | | 414/540 |
| 2,599,052 | A | | 6/1952 | Forman |
| 2,739,719 | A | * | 3/1956 | MacKaness .......... B60P 1/4407 |
| | | | | 414/546 |
| 3,233,758 | A | * | 2/1966 | Darfus .................. B60P 1/4442 |
| | | | | 414/540 |
| 3,638,817 | A | | 2/1972 | Corompt |
| 3,661,098 | A | * | 5/1972 | Jaekle .................. B61D 47/005 |
| | | | | 410/6 |
| 3,788,238 | A | * | 1/1974 | Bennett .................... B61D 3/18 |
| | | | | 410/6 |
| 3,814,271 | A | | 6/1974 | Loock |
| 3,844,424 | A | * | 10/1974 | Ross, Jr. ................ B61D 19/00 |
| | | | | 410/6 |
| 3,896,741 | A | * | 7/1975 | Chapman .................. B60P 3/07 |
| | | | | 410/6 |
| 3,902,616 | A | | 9/1975 | Santic et al. |
| 4,095,708 | A | | 6/1978 | Gerhard |
| 4,180,364 | A | * | 12/1979 | Fitzgerald-Smith .... E01D 15/22 |
| | | | | 414/350 |
| 4,268,209 | A | * | 5/1981 | Westerman ............. B60F 5/006 |
| | | | | 410/6 |
| 4,293,264 | A | | 10/1981 | Gilts et al. |
| 4,327,945 | A | | 5/1982 | Fowler |
| RE31,178 | E | * | 3/1983 | Deacon ................. B60P 1/4442 |
| | | | | 414/546 |
| 4,456,421 | A | * | 6/1984 | Robson ................. B60P 1/4428 |
| | | | | 414/541 |
| 4,634,335 | A | | 1/1987 | van den Pol |
| 5,618,150 | A | | 4/1997 | Poindexter |
| 5,651,657 | A | | 7/1997 | Poindexter |
| 5,816,764 | A | | 10/1998 | Bohata |
| 6,099,232 | A | | 8/2000 | Dixon et al. |
| 6,705,823 | B2 | | 3/2004 | Bohata |
| 6,932,401 | B1 | | 8/2005 | Eekhoff et al. |
| 7,513,731 | B2 | | 4/2009 | Studer |
| 7,597,526 | B2 | | 10/2009 | Benson |
| 8,152,432 | B2 | | 4/2012 | Cooper |
| 8,226,343 | B2 | | 7/2012 | Weeks et al. |
| 8,447,006 | B2 | | 5/2013 | Hempy et al. |
| 8,708,633 | B2 | | 4/2014 | Ward |
| 8,905,454 | B2 | | 12/2014 | Stock et al. |
| 8,939,697 | B2 | | 1/2015 | Herman et al. |
| 8,961,096 | B2 | | 2/2015 | Herman et al. |
| 2007/0166140 | A1 | * | 7/2007 | Warthan ................ B60P 1/4407 |
| | | | | 414/498 |
| 2008/0087698 | A1 | | 4/2008 | Campbell et al. |
| 2011/0085880 | A1 | * | 4/2011 | Davis .................... B60P 1/4442 |
| | | | | 414/546 |
| 2012/0195725 | A1 | * | 8/2012 | Meenen ................ B60P 1/5433 |
| | | | | 414/546 |
| 2012/0276262 | A1 | | 11/2012 | Schrader et al. |
| 2014/0219754 | A1 | | 8/2014 | Timonen |
| 2014/0224705 | A1 | | 8/2014 | Minor et al. |
| 2015/0016929 | A1 | | 1/2015 | Ward |

* cited by examiner

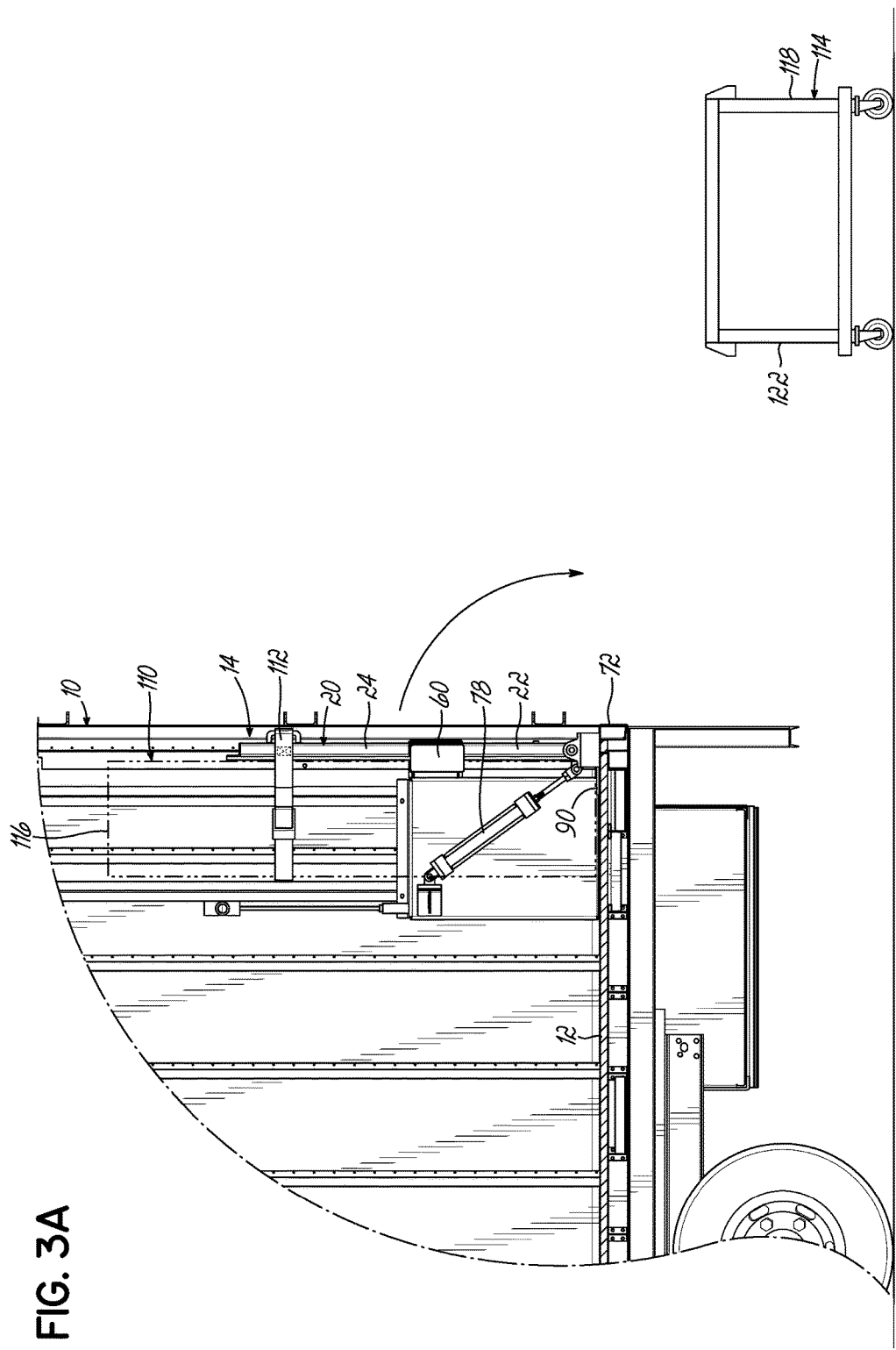

METHOD AND APPARATUS FOR LOADING AND/OR UNLOADING CASKETS

RELATED APPLICATIONS

This application claims the priority benefit of U.S. Provisional Patent Application No. 62/185,232 filed Jun. 26, 2015, which is hereby incorporated by reference herein as if fully set forth in its entirety.

FIELD OF THE INVENTION

This invention relates generally to caskets, and more particularly to shipping caskets.

BACKGROUND OF THE INVENTION

It is known to ship caskets in box trucks and in trailers of tractor-trailer rigs. Box trucks are typically used to deliver caskets to funeral homes, whereas tractor-trailer rigs are typically used to deliver caskets to warehouse distribution facilities.

When shipping caskets in a box truck, the caskets are typically loaded horizontally and placed on shelves. During delivery the caskets are pushed/pulled from the shelves onto a lift system that allows the casket to be lowered and placed upon a rolling and vertically extendible/retractable cart known as a "church truck." The church truck is supported on the pavement the same as the box truck. Consequently, the surface of the bed of the box truck can be several feet above the surface of the pavement.

When shipping caskets in trailers of tractor-trailer rigs, the caskets are typically loaded vertically, or "on end." Loading the caskets vertically allows more caskets to be hauled in a given size trailer than if the caskets were loaded horizontally, which is of course desirable. Caskets transported in trailers of tractor-trailer rigs are typically unloaded at a loading dock. The surface of the loading dock is generally at the same height as the surface of the bed of the trailer, i.e. the surfaces are generally co-planar. The caskets are unloaded at docks with the use of a four wheeled device known as a "tip cart." The tip cart has a base frame with four wheels, and a tip frame pivoted to one end of the base frame that pivots from horizontal to vertical. To unload a casket with the tip cart, the vertically oriented casket is moved to the edge of the trailer bed. The tip cart is rolled to the edge of the dock. The tip frame is manually pivoted from horizontal to vertical, the casket is secured to the tip frame, and the tip frame with casket secured thereto is manually pivoted from vertical to horizontal. The casket is then rolled on the tip cart. These devices allow the caskets to be safely moved out of trailers without damaging the caskets.

Previous attempts at utilizing vertical shipping of caskets in box trucks have not met with success. This is primarily due to the bed of the box truck being several feet above the surface of the pavement, which increases the risk of damage to the caskets and the safety risks to personnel during unloading of the caskets.

Accordingly, a casket loading and/or unloading apparatus and method which allows personnel to safely unload vertical caskets from a box truck without damaging the caskets is desirable.

For that matter, a casket loading and/or unloading apparatus and method which allows personnel to safely unload vertical caskets from any transport vehicle, where the surface of the bed of the vehicle is above the surface to which the casket is being unloaded to, without damaging the caskets, is also desirable. Such a transport vehicle could be the aforementioned box truck, but it could also be a trailer of a tractor-trailer rig, etc.

SUMMARY OF THE INVENTION

In one aspect, a casket loading and/or unloading apparatus comprises a frame having an end adapted to be pivoted adjacent a rear edge of a bed of a transport vehicle for pivoting about a pivot axis generally transverse to a longitudinal axis of the transport vehicle, and a motion generating device operable between the frame and the transport vehicle for pivoting the frame from a first generally vertical position to a second at least generally horizontal position. A vertically oriented casket in the transport vehicle can be secured to the frame, and the frame with the casket secured thereto can be pivoted from the first generally vertical position to the second at least generally horizontal position to facilitate unloading the casket from the transport vehicle.

The second position can be beyond horizontal. The transport vehicle can be a box truck. The motion generating device can be a hydraulic piston and cylinder. The apparatus can further include a plate removably attached to the end of the frame, oriented generally perpendicularly to the frame, and projecting forwardly from the frame when the frame is in the first generally vertical position, the plate adapted to support an end wall of the vertically oriented casket. The apparatus can further include lubricious material on the frame to facilitate sliding of the casket on the frame.

In another aspect, a combination transport vehicle and casket loading and/or unloading apparatus comprises a transport vehicle bed with a rear edge, a frame having an end pivoted adjacent the rear edge of the bed for pivoting about a pivot axis generally transverse to a longitudinal axis of the transport vehicle, and a motion generating device operable between the frame and the transport vehicle for pivoting the frame from a first generally vertical position to a second at least generally horizontal position. A vertically oriented casket in the transport vehicle can be secured to the frame, and the frame with the casket secured thereto can be pivoted from the first generally vertical position to the second at least generally horizontal position to facilitate unloading the casket from the transport vehicle.

In another aspect, a method of unloading a vertically oriented casket from a transport vehicle comprises securing the vertically oriented casket to a frame having an end pivoted adjacent a rear edge of a bed of the vehicle, positioning a cart aft of the rear edge of the bed, pivoting the frame and casket from a first generally vertical position to a second at least generally horizontal position until an aft end of the casket contacts an aft end of the cart, and further pivoting the frame and casket until a forward end of the casket contacts a forward end of the cart.

The second position can be beyond horizontal. The method can further include sliding the casket off of the frame and/or moving the cart away from the frame.

In another aspect, a method of unloading a vertically oriented casket from a transport vehicle comprises securing the vertically oriented casket to a frame having an end pivoted adjacent a rear edge of a bed of the vehicle, positioning a cart aft of the rear edge of the bed, pivoting the frame and casket from a first generally vertical position to a second at least generally horizontal position until an aft end of the casket contacts an aft end of the cart, and additionally performing at least one of the following steps: (a) further pivoting the frame and casket until a forward end of the casket contacts a forward end of the cart, (b) sliding the casket off of the frame, (c) moving the cart away from the frame.

All three of the steps (a), (b), and (c) can additionally be performed.

In another aspect, a method of unloading a vertically oriented casket from a transport vehicle comprises securing the vertically oriented casket to a frame having an end pivoted adjacent a rear edge of a bed of the vehicle, positioning a cart aft of the rear edge of the bed, pivoting the frame and casket from a first generally vertical position to a second position beyond horizontal, sliding the casket rearwardly until an aft end of the casket contacts an aft end of the cart, and further pivoting the frame and casket until a forward end of the casket contacts a forward end of the cart.

The cart can be rolled rearwardly during the step of further pivoting the frame and casket. The transport vehicle can be a box truck.

The accompanying drawings, which are incorporated in and constitute a part of this specification, illustrate embodiments of the invention and, together with the summary of the invention given above, and the detailed description of the drawings given below, serve to explain the principles of the present invention.

BRIEF DESCRIPTION OF THE DRAWINGS

FIGS. 3A-3D illustrate the steps in unloading a vertical casket from a box truck with the apparatus of FIGS. 1 and 2.

DETAILED DESCRIPTION OF THE DRAWINGS

Figure 1:
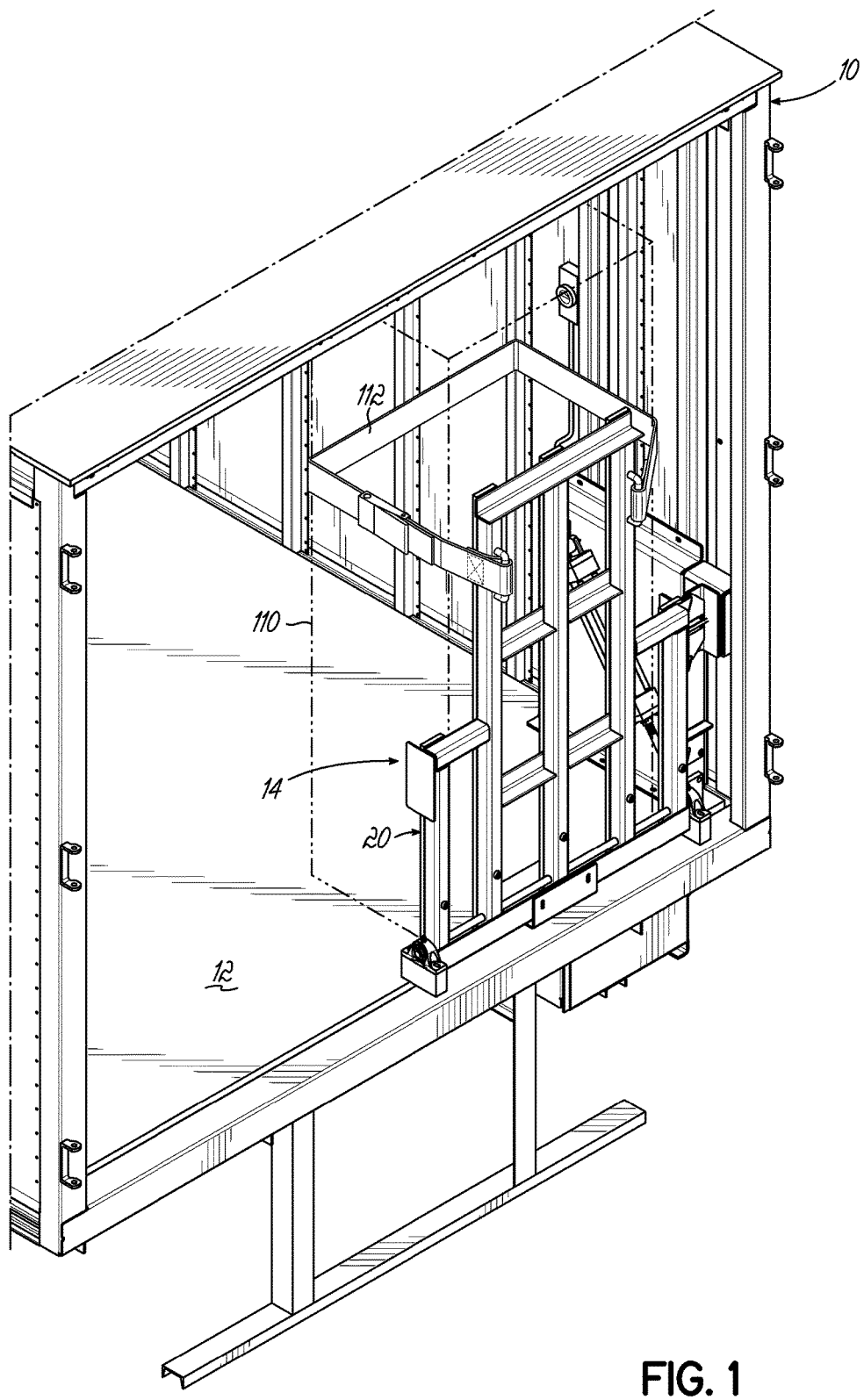
FIG. 1 is a perspective view of an end of a box truck including the apparatus of the present invention.
Figure 2:
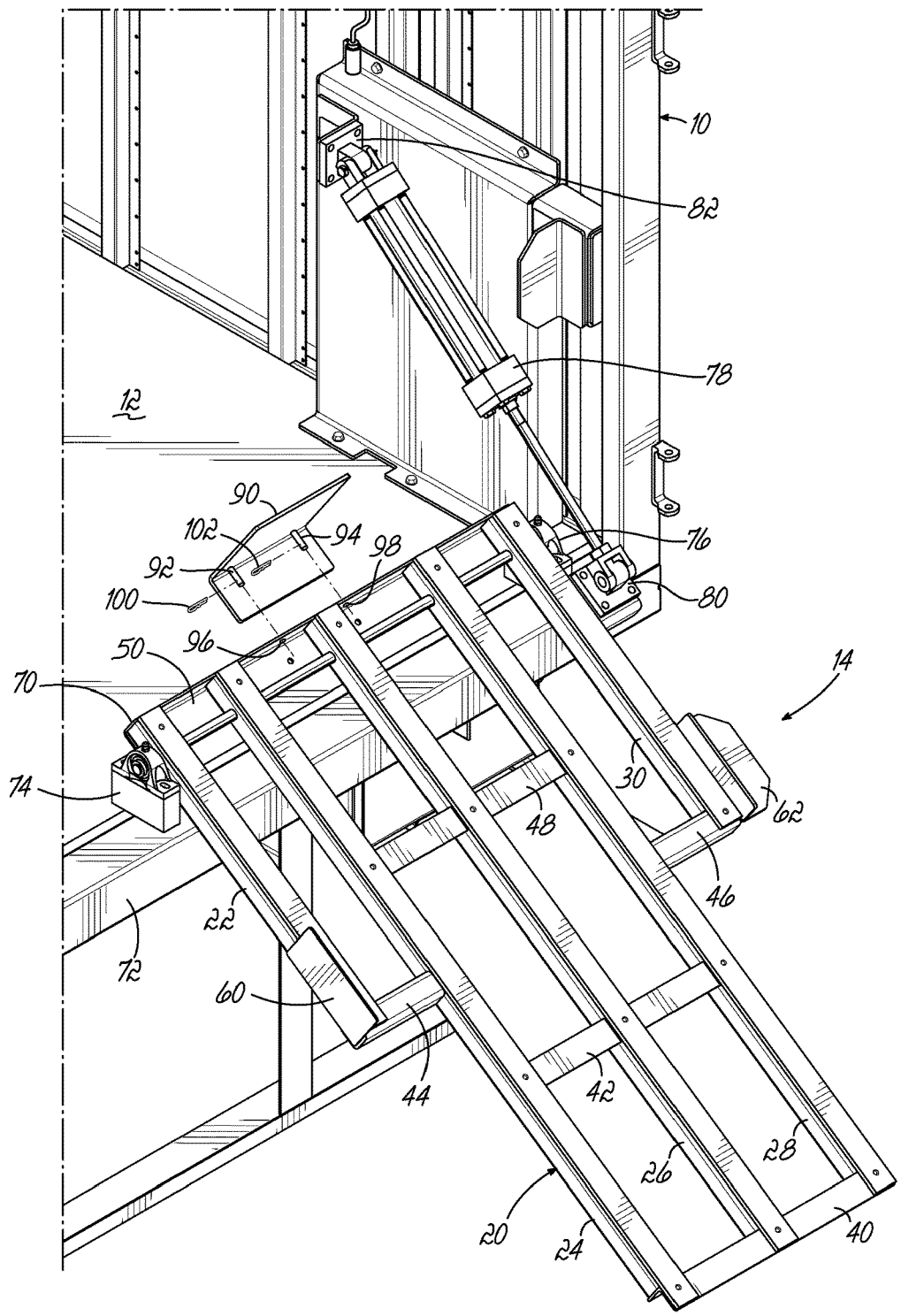
FIG. 2 is an enlarged perspective view of the end of the box truck of FIG. 1.

Referring first to FIGS. 1 and 2, a transport vehicle, for example box truck 10, with a bed 12 is illustrated with a casket loading and/or unloading apparatus 14 mounted thereto. The apparatus 14 could as well be mounted to a trailer.

The apparatus 14 has a frame 20 having longitudinal frame members 22, 24, 26, 28, and 30, interconnected by transverse frame members 40, 42, 44, 46, 48, and 50. A pair of laterally positioned plates 60, 62 are attached to frame members 22, 30, respectively, and maintain a casket (phantom, FIG. 1) positioned laterally on the frame 20. At least some of the frame members have attached thereto a lubricious, i.e. low coefficient of sliding friction, material, such as plastic strips, to aid in sliding a casket off of the frame 20.

Figure 3B:
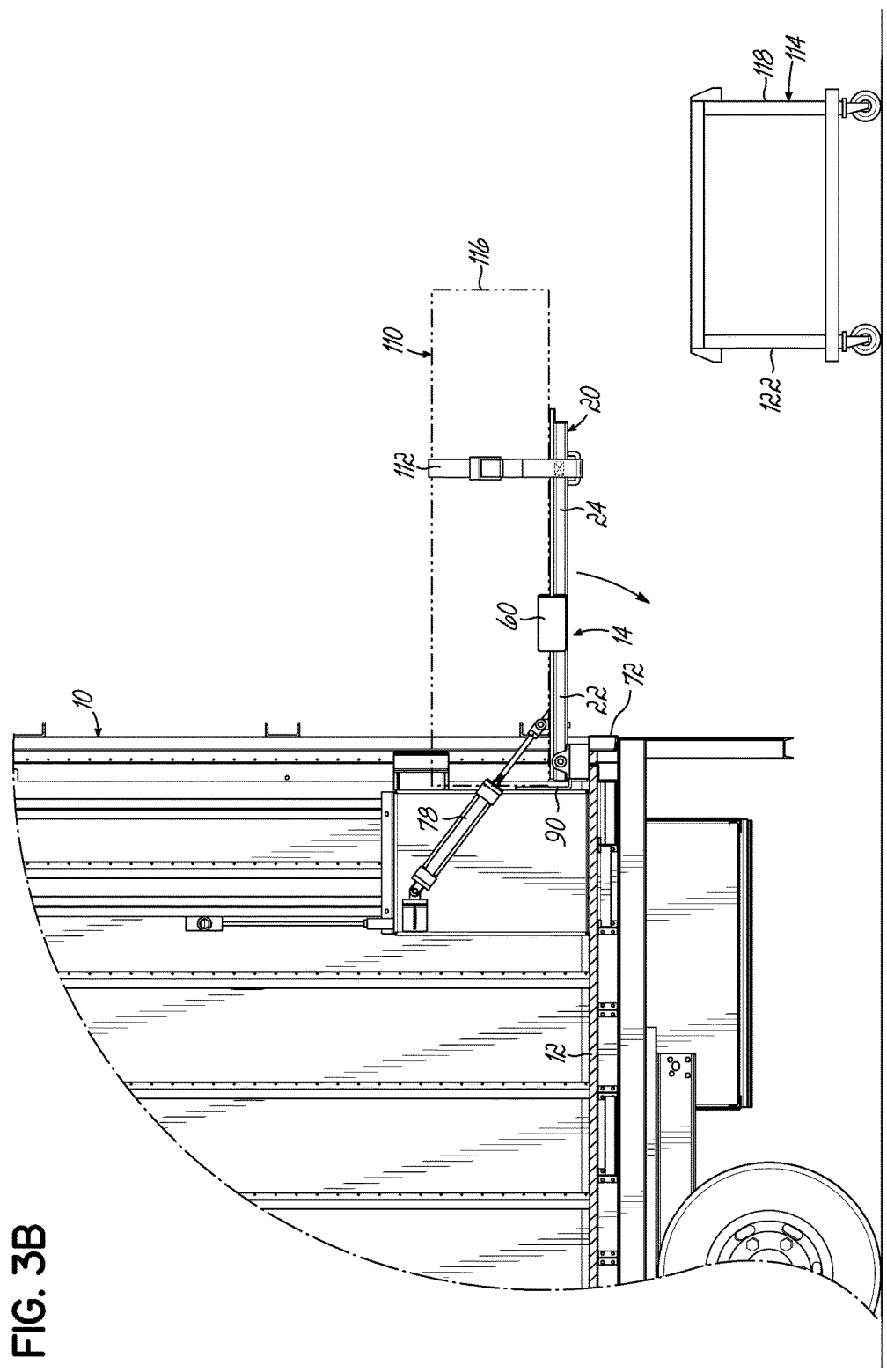
Figure 3C:
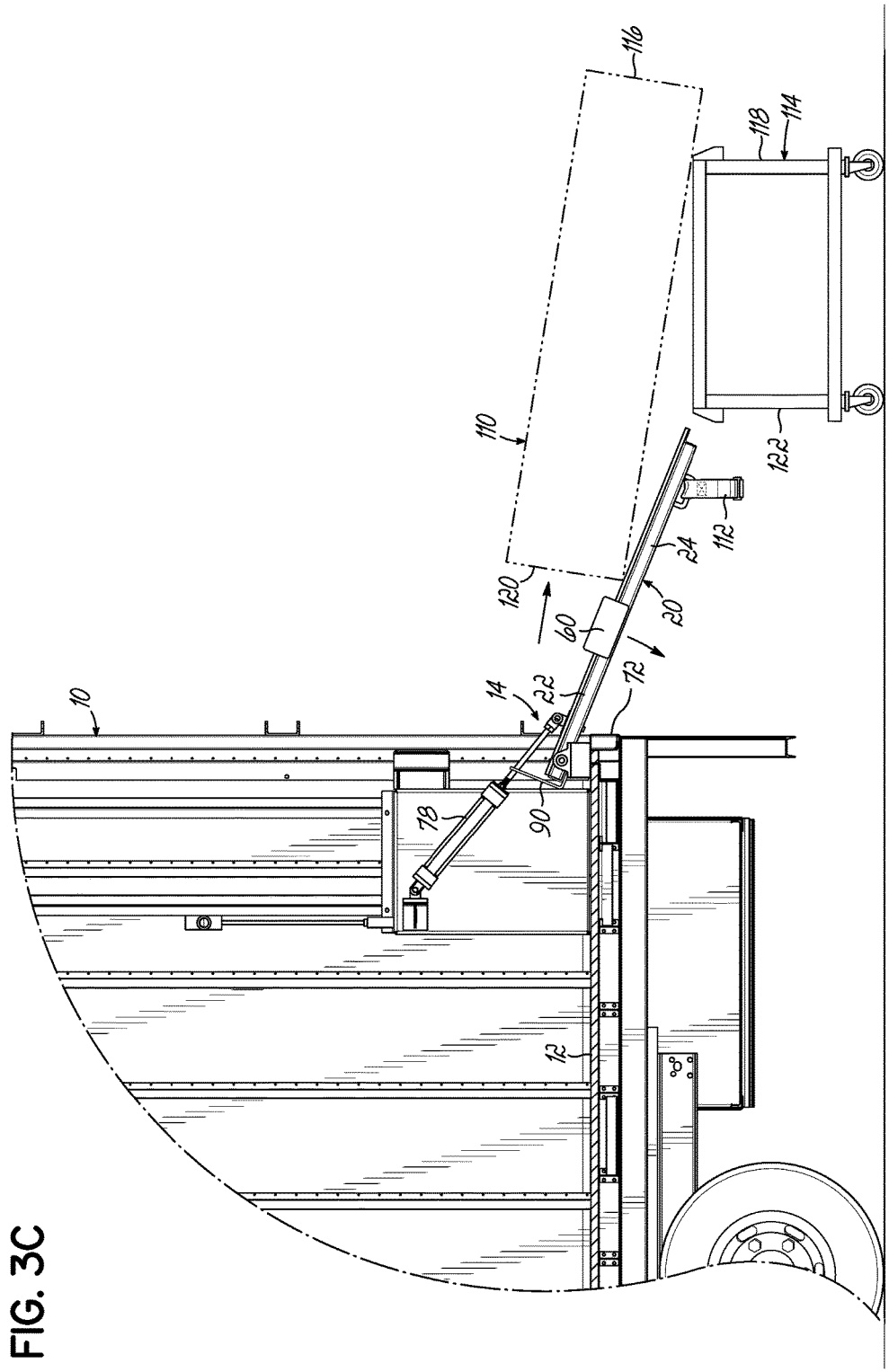
Figure 3D:
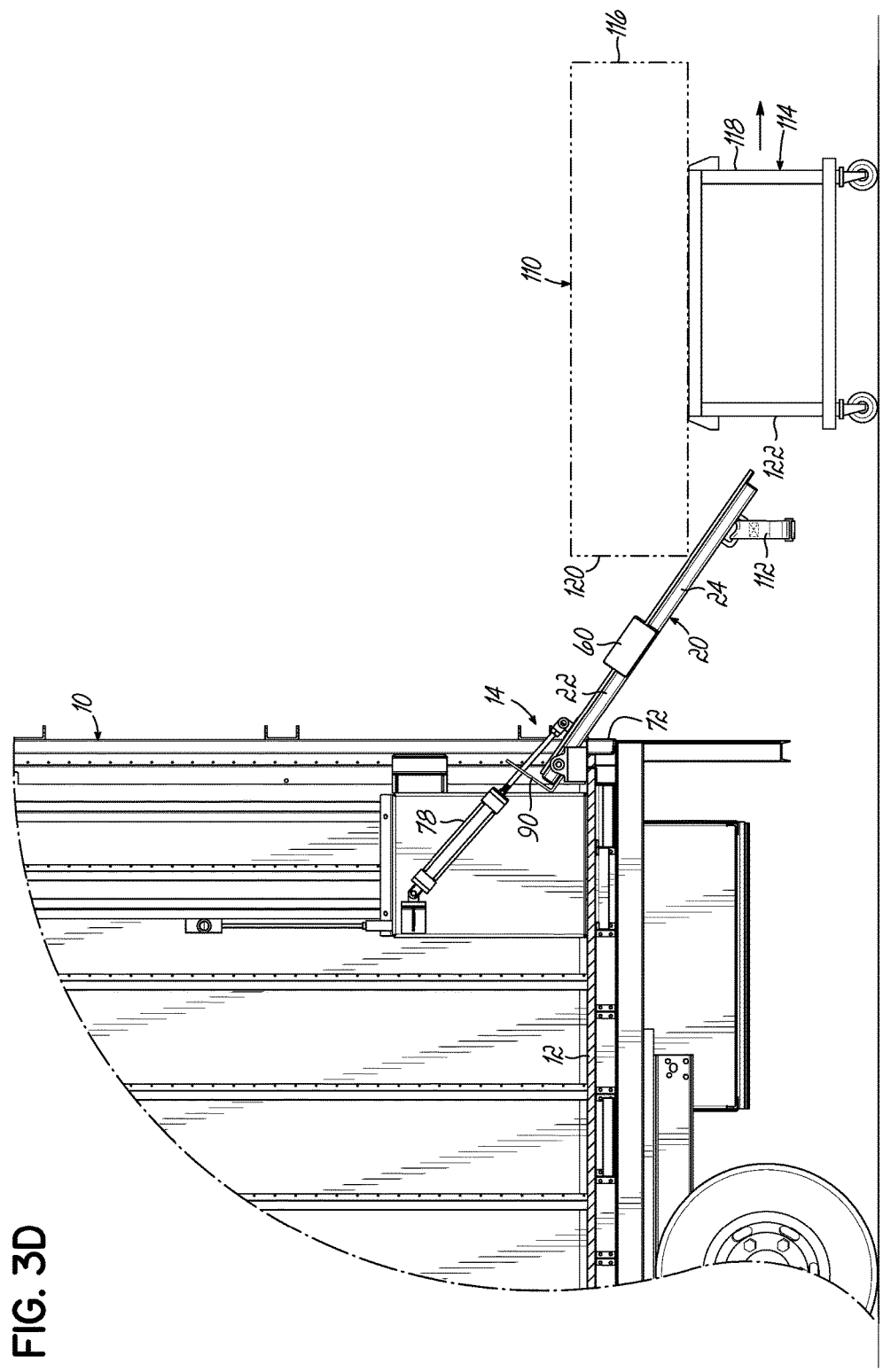

Frame 20 has an end 70 pivoted adjacent a rear edge 72 of bed 12 at pivots 74, 76. A motion generating device, for example hydraulic piston and cylinder 78, is attached to the frame 20 at 80 and to the box truck 10 at 82 and pivots the frame 20 from a first generally vertical position (FIG. 1) to a second at least generally horizontally position (FIG. 2). Preferably the second position is beyond horizontal, for example an angle of between about 90 degrees and about 180 degrees from vertical, and more preferably about 125 degrees (FIG. 3D). Other motion generating devices could be used, for example a cable/winch system, etc.

Referring to FIG. 2, a support plate 90 is removably attached to frame member 50 via pins 92, 94 passing through holes 96, 98 in frame member 50. Locking pins 100, 102 pass through holes (not shown) in the pins 92, 94 to removably secure the support plate 90 to the frame member 50. Support plate 90 supports an end wall of a vertically oriented casket (FIG. 1), not unlike that of a dolly. The support plate 90 can, however, be removed to allow a horizontally loaded casket to be unloaded with the apparatus 14.

Referring now to FIGS. 3A-3D, use of the apparatus 14 will be described. A vertically oriented casket 110 (phantom), is positioned against frame 20 of apparatus 14 and atop support plate 90 with frame 20 being in a generally vertical position. The casket 110 is secured to the frame with, for example, a ratchet strap 112. A wheeled cart 114, for example church truck or the like, is positioned aft of the rear edge 72 of the bed 12 of the box truck 10. The frame 20 is pivoted via the hydraulic piston and cylinder 78 until the aft end 116 of the casket 110 contacts the aft end 118 of the cart 114. The frame 20 is further pivoted via the hydraulic piston and cylinder 78 until the forward end 120 of the casket 110 contacts the forward end 122 of the cart 114. The casket 110 can be slid off the frame 20 and/or the cart 114 can be moved away from the frame 20 to completely remove the casket 110 from the box truck 10.

Preferably, the frame 20 and casket 110 are pivoted from a first generally vertical position to a second position beyond horizontal. Then the casket 110 is slid rearwardly until the aft end 116 of the casket 110 contacts an aft end 118 of the cart 114. Then, the frame 20 and casket 110 are further pivoted until a forward end 120 of the casket 110 contacts a forward end 122 of the cart 114. The cart 114 can either be rolled rearwardly during further pivoting of the frame 20 and casket 110 prior to the forward end 120 of the casket 110 contacting the forward end 122 of the cart 114, or after pivoting of the frame 20 and casket 110 and after the forward end 120 of the casket 110 contacts the forward end 122 of the cart 114.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. The invention resides in each individual feature described herein, alone, and in all combinations of any and all of those features. Departures may therefore be made from such details without departing from the spirit or scope of the general inventive concept. Accordingly, the scope of the invention shall be limited only by the following claims and their equivalents.

What is claimed is:

1. A casket loading and/or unloading apparatus comprising:
   a frame having an end adapted to be pivoted adjacent a rear edge of a bed of a transport vehicle for pivoting about a pivot axis generally transverse to a longitudinal axis of the transport vehicle, the transport vehicle having a rear door opening, said frame adapted to be pivoted to the bed inside the door opening, and
   a motion generating device operable between said frame and the transport vehicle for pivoting said frame from a first generally vertical position to a second position at least about 90 degrees from the first position,
   whereby a vertically oriented casket in the transport vehicle can be secured to said frame, and said frame with the casket secured thereto can be pivoted from the first position to the second position to facilitate unloading the casket from the transport vehicle,
   further including an L-shaped plate having a leg portion and a foot portion, said foot portion removably attached to said end of said frame, said leg portion oriented generally perpendicularly to said frame, and projecting forwardly from said frame towards a front end of the vehicle when said frame is in the first generally vertical position, said leg portion of said plate adapted to support an end wall of the vertically oriented casket.

2. The apparatus of claim 1 wherein the second position is greater than 90 degrees from the first position.

3. The apparatus of claim 1 wherein the transport vehicle is a box truck.

4. The apparatus of claim 1 wherein said motion generating device is a hydraulic piston and cylinder.

5. The apparatus of claim 1 wherein said foot portion of said support plate is removably attached to a frame member of said frame via attachment pins on said foot portion passing through clearance holes in said frame member and locking pins passing through clearance holes in said attachment pins.

6. The apparatus of claim 1 further including lubricious material on said frame to facilitate sliding of the casket on said frame.

7. A combination transport vehicle and casket loading and/or unloading apparatus comprising:
a transport vehicle bed with a rear edge and a rear door opening,
a frame having an end pivoted adjacent said rear edge of said bed to said bed and inside said door opening for pivoting about a pivot axis generally transverse to a longitudinal axis of said transport vehicle, and
a motion generating device operable between said frame and said transport vehicle for pivoting said frame from a first generally vertical position to a second position at least about 90 degrees from the first position,
whereby a vertically oriented casket in said transport vehicle can be secured to said frame, and said frame with the casket secured thereto can be pivoted from the first position to the second position to facilitate unloading the casket from said transport vehicle,
further including an L-shaped plate having a leg portion and a foot portion, said foot portion removably attached to said end of said frame, said leg portion oriented generally perpendicularly to said frame, and projecting forwardly from said frame towards a front end of said vehicle when said frame is in the first generally vertical position, said leg portion of said plate adapted to support an end wall of the vertically oriented casket.

8. The combination of claim 7 wherein the second position is greater than 90 degrees from the first position.

9. The combination of claim 7 wherein said transport vehicle is a box truck.

10. The combination of claim 7 wherein said motion generating device is a hydraulic piston and cylinder.

11. The combination of claim 7 wherein said foot portion of said support plate is removably attached to a frame member of said frame via attachment pins on said foot portion passing through clearance holes in said frame member and locking pins passing through clearance holes in said attachment pins.

12. The combination of claim 7 further including lubricious material on said frame to facilitate sliding of the casket on said frame.

13. A method of unloading a vertically oriented casket from a transport vehicle comprising:
securing the vertically oriented casket to a frame having an end pivoted adjacent a rear edge of a bed of the vehicle to the bed and inside a rear door opening of the vehicle, the frame further including an L-shaped plate having a leg portion and a foot portion, the foot portion removably attached to the end of the frame, the leg portion oriented generally perpendicularly to the frame, and projecting forwardly from the frame towards a front end of the vehicle when the frame is in a first generally vertical position, the leg portion of the plate supporting an end wall of the vertically oriented casket,
positioning a cart aft of the rear edge of the bed,
pivoting the frame and casket from the first position to a second position at least about 90 degrees from the first position until an aft end of the casket contacts an aft end of the cart, and
further pivoting the frame and casket until a forward end of the casket contacts a forward end of the cart.

14. The method of claim 13 wherein the second position is greater than 90 degrees from the first position.

15. The method of claim 13 further including sliding the casket off of the frame.

16. The method of claim 13 further including moving the cart away from the frame.

17. The method of claim 13 wherein the step of attaching the L-shaped plate to the frame comprises passing attachment pins on the foot portion of the L-shaped plate through clearance holes in a frame member of the frame and passing locking pins through clearance holes in the attachment pins.

18. The method of claim 17 further comprising:
attaching the L-shaped plate to the frame as a first step,
securing the vertically oriented casket to the frame, including supporting the end wall of the vertically oriented casket on the leg portion of the L-shaped plate, as a second step, and
removing the L-shaped plate from the frame as a final step.

19. A method of unloading a vertically oriented casket from a transport vehicle comprising:
securing the vertically oriented casket to a frame having an end pivoted adjacent a rear edge of a bed of the vehicle to the bed and inside a rear door opening of the vehicle, the frame further including an L-shaped plate having a leg portion and a foot portion, the foot portion removably attached to the end of the frame, the leg portion oriented generally perpendicularly to the frame, and projecting forwardly from the frame towards a front end of the vehicle when the frame is in a first generally vertical position, the leg portion of the plate supporting an end wall of the vertically oriented casket,
positioning a cart aft of the rear edge of the bed,
pivoting the frame and casket from the first position to a second position at least about 90 degrees from the first position until an aft end of the casket contacts an aft end of the cart, and
additionally performing at least one of the following steps:
(a) further pivoting the frame and casket until a forward end of the casket contacts a forward end of the cart,
(b) sliding the casket off of the frame,
(c) moving the cart away from the frame.

20. The method of claim 19 wherein all three of the steps (a), (b), and (c) are additionally performed.

21. The method of claim 19 wherein the step of attaching the L-shaped plate to the frame comprises passing attachment pins on the foot portion of the L-shaped plate through clearance holes in a frame member of the frame and passing locking pins through clearance holes in the attachment pins.

22. The method of claim 21 further comprising:
attaching the L-shaped plate to the frame as a first step,
securing the vertically oriented casket to the frame, including supporting the end wall of the vertically oriented casket on the leg portion of the L-shaped plate, as a second step, and
removing the L-shaped plate from the frame as a final step.

23. A method of unloading a vertically oriented casket from a transport vehicle comprising:

securing the vertically oriented casket to a frame having an end pivoted adjacent a rear edge of a bed of the vehicle to the bed and inside a rear door opening of the vehicle, the frame further including an L-shaped plate having a leg portion and a foot portion, the foot portion removably attached to the end of the frame, the leg portion oriented generally perpendicularly to the frame, and projecting forwardly from the frame towards a front end of the vehicle when the frame is in a first generally vertical position, the leg portion of the plate supporting an end wall of the vertically oriented casket, positioning a cart aft of the rear edge of the bed, pivoting the frame and casket from the first position to a second position at least about 90 degrees from the first position, sliding the casket rearwardly until an aft end of the casket contacts an aft end of the cart, and further pivoting the frame and casket until a forward end of the casket contacts a forward end of the cart.

24. The method of claim 23 wherein the cart is rolled rearwardly during the step of further pivoting the frame and casket.

25. The method of claim 23 wherein the transport vehicle is a box truck.

26. The method of claim 23 wherein the step of attaching the L-shaped plate to the frame comprises passing attachment pins on the foot portion of the L-shaped plate through clearance holes in a frame member of the frame and passing locking pins through clearance holes in the attachment pins.

27. The method of claim 26 further comprising:

attaching the L-shaped plate to the frame as a first step, securing the vertically oriented casket to the frame, including supporting the end wall of the vertically oriented casket on the leg portion of the L-shaped plate, as a second step, and removing the L-shaped plate from the frame as a final step.

* * * * *